UNITED STATES PATENT OFFICE.

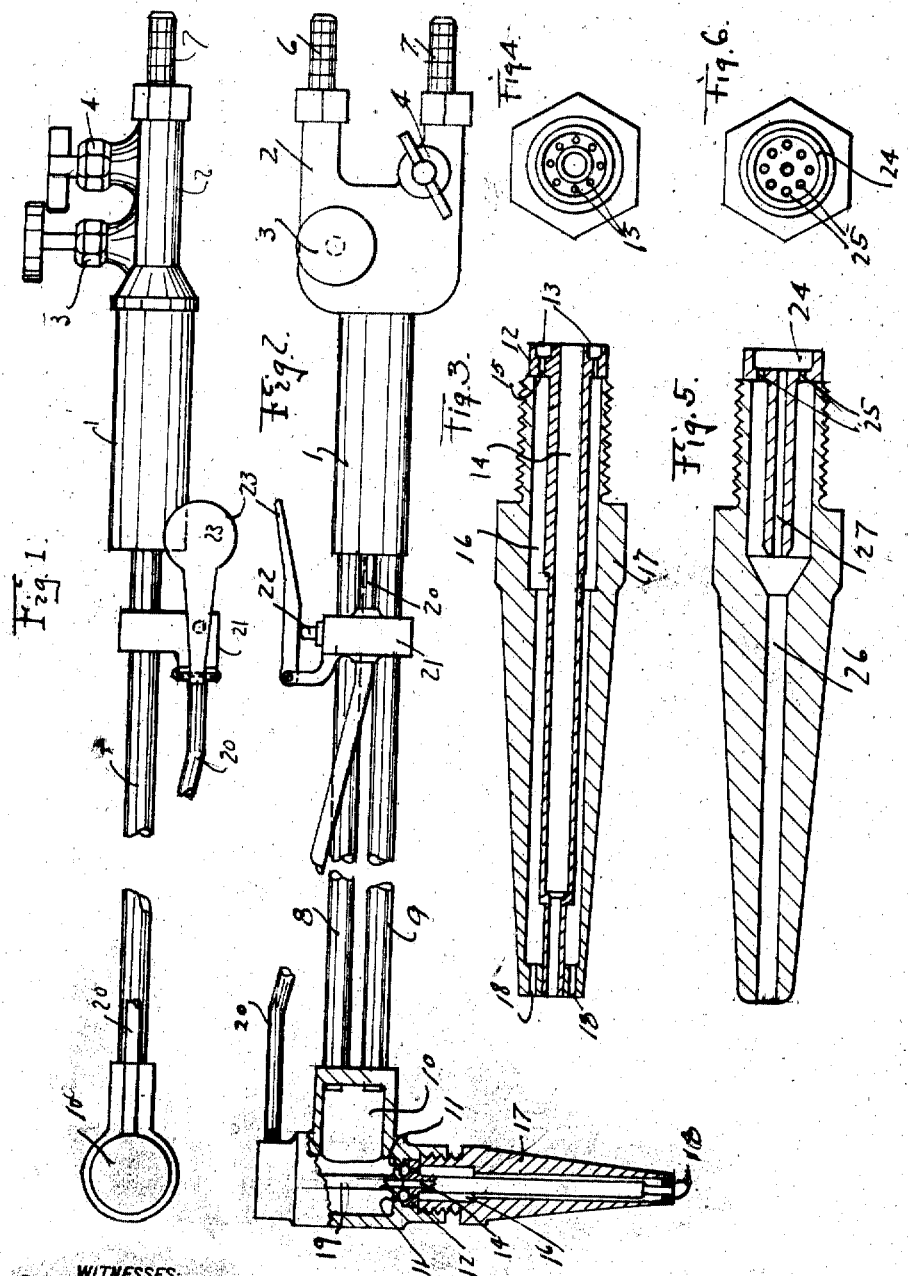

EDWARD P. CARLSON, OF SEATTLE, WASHINGTON.

CUTTING AND WELDING TORCH.

1,281,289.   Specification of Letters Patent.   Patented Oct. 15, 1918.

Application filed October 18, 1917. Serial No. 197,355.

*To all whom it may concern:*

Be it known that I, EDWARD P. CARLSON, citizen of the United States, residing at Seattle, in the county of King and State of Washington, have invented certain new and useful Improvements in Cutting and Welding Torches, of which the following is a specification.

This invention relates to improvements in cutting and welding torches and has for its principal object to provide an improved and novel type of torch which permits of the use of ordinary illuminating gas and any one of several other cheap gases as a fuel for the torch; to provide improved and novel means for mixing the fuel gas with oxygen prior to ignition; to provide novel arrangement of tubes and detachable points for delivering an auxiliary supply of oxygen through the tip. Due to the expense of acetylene gas and oxygen it is highly desirable that a torch be brought out which will utilize illuminating gas and other cheap gases for cutting torches. My device is designed specifically for use with illuminating gas but has been used with other gases such as oil and water gas. I have found that proper mixing means for thoroughly mixing the gas and oxygen within the torch and prior to the ignition is a very important feature of the utilization of fuel gas thereby the improved mixing means is of the utmost importance in this case.

Other objects will appear as my invention is more fully explained in the following specification, illustrated in the accompanying drawings and pointed out in the appended claim.

In the drawings Figure 1 is a plan view of my device with parts broken away. Fig. 2 is a side elevation of same with the cutting tips shown in section. Fig. 3 is an enlarged longitudinal section of a cutting tip. Fig. 4 is an end elevation of same. Fig. 5 is a longitudinal section of a welding tip. Fig. 6 is an end elevation of same.

Referring more particularly to the drawings numeral 1 indicates a handle to one end of which is secured a valve body 2 within which a gas valve 3 and an oxygen valve 4 are mounted. Connections 6 and 7 are provided with tubes from gas and oxygen tanks respectively. It will be understood that the gas and oxygen are carried forward through the handle separately and then into tubes 8 and 9, respectively, so that they are finally delivered within a torch head 10 in an unmixed condition. Within the torch head the gas and oxygen may mix to some extent but they are not thoroughly mixed until they are delivered to the tip. The gas and oxygen pass from the torch head through a series of perforations 11 into a mixer 12 which is positioned intermediate the torch head and the point. The mixer 12 as shown in Figs. 2 and 3 comprises a disk shaped member around the upper face of which an annular groove 13 is cut. The outer rim of the disk and the central portion which surrounds a tubular member 14 fits snugly up against a similarly grooved face in the lower portion of the head 10. Perforations 15 extend from the annular groove 13 through to the inner face of the mixer. It will be understood that the perforations 15 and the perforations 11 are arranged in staggered relationship to each other in order that the gas and oxygen which enters the annular groove 13 will be thoroughly mixed within the said groove before passing along through the perforations 15 into the chamber 16 which is within the tip 17. After passing through the chamber 16 the mixture of gas and oxygen passes out through openings 18 in the extreme end of the tip. The tubular member 14 is commonly known as an oxygen tube and extends integral with the mixer directly down to the point of the tip where it passes through an opening which it fits snugly and discharges directly through the very outer end of the tip. An oxygen tube 19 passes centrally through the head 10 and at its lower end registers with the opening in member 14 while its upper end leads directly to a pipe 20 which leads back to a valve box 21 where the opening is controlled by means of a spring valve 22 and thumb lever 23. After passing through the valve box 21 the pipe 20 continues into handle 1 where it connects to the main oxygen pipe 9. It will thus be seen that an auxiliary supply of oxygen for cutting purposes is supplied through the pipe 20 and is controlled by the valve 22 independent of the mixture of oxygen and gas. In the tip shown in Figs. 5 and 6 there is no auxiliary oxygen supply and the mixture of oxygen and gas enters a mixer 24 which is hollowed out similar to the annular groove 13 and which has perforations 25 which are similar to perforations 15 in order to permit the mixture of gas and oxygen to pass through a central opening 26 to the point of the tip. In order to further assist in mixing within the chamber below the mixer an extension tube 27 is made integral with the mixer and extends well down into the tip so that some of the gas and oxygen flows through the perforations 25 while another portion flows through the extension tube 27, the two co-mingling after they pass the outlet of the extension tube. It will be understood that either of the points may be easily and quickly placed within the head by means of coöperating threads as shown so that they are interchangeable. One of the tips is used in the art for welding, whereas, the other tip is used for cutting. In reheating the metal it is usual to use the auxiliary supply of pure oxygen. However, these particular features are well known in the art and applicant's invention lies in his specific type of torch and his specific mixing means as it is these features which permit him to use fuel gas.

Having described my invention, what I claim as new and desire to protect by Letters Patent, is:—

In an acetylene cutting and welding torch having a hollow head with independent gas and oxygen inlets and an auxiliary oxygen inlet, the combination of an auxiliary oxygen tube passing through the said head, an annular groove around the outlet of the auxiliary oxygen tube, radial perforations connecting with the interior of the head and the said annular groove, a disk shaped mixer member, an annular groove in the upper face of the said disk shaped member, the last mentioned groove coöperating with the first mentioned groove, a tubular member centrally located with respect to the said disk and communicating with the auxiliary oxygen tube, perforations communicating with the annular groove in the disk and passing through the said disk and arranged in staggered relationship with the first mentioned perforations, whereby the gas and oxygen are mixed as they pass through the first mentioned perforations, the annular grooves and the perforations in the disk.

In testimony whereof I affix my signature in the presence of two witnesses.

EDWARD P. CARLSON.

Witnesses:
 FRANK H. FOWLER,
 MARGUERITE LEYDA.